3,322,563
PROCESS OF PREPARING AN ADSORBENT
Raymond H. Moore, Kennewick, Wash., assignor to the United States of America as represented by the United States Atomic Energy Commission
No Drawing. Filed Aug. 30, 1963, Ser. No. 305,899
2 Claims. (Cl. 117—100)

The invention described herein was made in the course of, or under, a contract with the United States Atomic Energy Commission.

This invention deals with an ion exchange material and the process of making it.

It is an object of this invention to provide a process for preparing an ion exchange material that has a relatively low resistance to the flow of liquids and thus permits flow of the liquid to be treated over a bed or column of the material and yet has a large actve surface area.

It is also an object of this invention to provide an ion exchange material that, when suspended in a liquid to be treated, settles rapidly and can be easily separated by decantation or filtration.

Another object of this invention is an ion exchange material that can be used for the removal of cations from aqueous, organic or molten salt solution.

The process of this invention comprises contacting silica with an aqueous slurry of uranyl phosphate, whereby the uranyl phosphate is deposited on the silica, and drying the so impregnated silica at a temperature of between 130 and 175° C. The material obtained by this process is also part of this invention.

Silica can be used in the form of silica gel or of ignited silica. While the process is primarily concerned with silica as the carrier for the uranyl phosphate, other inert materials for instance alumina, can also be used. The uranyl phosphate preferred in uranyl monohydrogen phosphate. The deposition of the uranyl phosphate can be accomplished either by flowing the slurry over the carrier material or else by suspending carrier material in the slurry and then separating the impregnated carrier from the liquid.

The material produced by the process of this invention is intended basically for the removal of fission products from solutions, and in particular of radioactive fission products present in waste solutions that have been obtained after the extraction of uranium and plutonium from nitric acid solutions of neutron-bombarded nuclear fuel. However, it will be understood that other solutions lend themselves also to treatment with the ion exchanger of this invention. The adsorbent of this invention has a particularly great efficiency for cations that form phosphates more insoluble than uranyl phosphates. Among these are those fission products the separation of which from uranium by solvent extraction usually is the most difficult and incomplete; these fission products are strontium, zirconium, niobium and some of the lanthanide rare earths.

In the following a few examples are given to illustrate the effectiveness of the ion exchanger of this invention.

Example I

A slurry of uranyl monohydrogen phosphate was added slowly to ignited silica of a particle size between 80 and 120 mesh, and the mixture was rapidly stirred while it was maintained at between 130 and 170° C. The water evaporated thereby and an adsorbent was obtained that consisted of silica granules covered by a thin adherent film of uranyl monohydrogen phosphate.

This material was packed into a column 1.0 cm. in diameter and 8.5 cm. in height. An aqueous solution was flowed through the column at steadily increasing flow rates in order to determine how high a flow rate could be used under a gravity head up to 6 inches of water. A flow rate of between 8 and 8.5 ml./min. was possible.

For the sake of comparison, a similar column, but half as long, was packed with a homogeneous mixture of finely-divided uranyl monohydrogen phosphate and diatomaceous earth, weight ratio 1:1, and the same type of aqueous solution was passed through said column. The diatomaceous earth had the same particle size as the uranyl-phosphate-coated silica. A period of 37 hours was required to pass 15 ml. of the aqueous solution through the column under a nitrogen pressure of 6 lbs. gage. This clearly shows the superiority of the adsorbent of this invention.

The following examples illustrate the removal of various cations from different types of solutions by the ion exchanger of this invention.

Example II

Silica coated with uranyl monohydrogen phosphate and prepared as described in Example I was packed into a column having a diameter of 1 cm. and a height of 10 cm. An about neutral solution of strontium chloride containing 1130 p.p.m. of strontium was flowed through the column, and various fractions of the effluent were analyzed with a flame photometer. The results are shown in Table I.

Table I lists the strontium contents remaining in the various effluent fractions after an increasing number of "column volumes" of solution have been passed through the column and the decontamination factors calculated on the basis of these contents. The decontamination factors (DF) are expressed by the ratio of strontium concentration in the feed solution to that in the respective effluent fraction.

TABLE I

| Fraction No. | Column Volumes | Sr, p.p.m. | DF |
|---|---|---|---|
| 1 | 4 | <0.5 | >2,000 |
| 2 | 8 | <0.5 | >2,000 |
| 3 | 12 | <0.5 | >2,000 |
| 4 | 16 | <0.5 | <2,000 |
| 5 | 20 | <0.5 | >2,000 |
| 6 | 24 | <0.5 | >2,000 |
| 7 | 28 | <0.5 | >2,000 |
| 8 | 32 | <0.5 | >2,000 |
| 9 | 52 | 220 | 5 |
| 10 | 72 | 1,010 | 0 |

The above results illustrate that strontium can be efficiently removed from aqueous solutions by this procedure up to at least about 30 column volumes.

Example III

In this example zirconium and niobium were removed from a tributyl phosphate solution with the same ion exchange material as used in the preceding examples; the column also had the same dimensions. The column contained 8.76 grams of ion exchange material on which 0.175 gram of $UO_2HPO_4$ had been deposited by the process described. A tributyl phosphate solution containing zirconium and niobium in a total concentration of about 15,375 r./m./ml. was fed to this column at a rate of 7.5 ml./hr., and the effluent was collected in 2-ml. fractions and analyzed each time for zirconium plus niobium. The results of this experiment are summarized in Table II.

TABLE II

| Fraction No. | Column Volumes | Zr-Nb, r./m./ml. | Zr-Nb DF |
|---|---|---|---|
| 1 | 0.8 | 31 | |
| 2 | 1.6 | 1,124 | |
| 3 | 2.4 | 2,127 | 7.2 |
| 4 | 3.2 | 2,228 | 6.9 |
| 5 | 4.0 | 2,299 | 6.7 |
| 6 | 4.8 | 2,342 | 6.6 |
| 7 | 5.6 | 2,387 | 6.4 |
| 8 | 6.4 | 2,379 | 6.5 |
| 9 | 7.2 | 2,405 | 6.4 |

Satisfactory removal of zirconium and niobium was obtained throughout the run.

Example IV illustrates the use of the ion exchange material of this invention for the treatment of molten salt solutions.

*Example IV*

In this example the adsorbent was prepared by a slightly different process in order to obtain a material that was thermally stable at the temperature required to maintain the salt solution in the molten condition.

A solution of sodium pyrophosphate was added to a uranyl nitrate solution, whereby uranyl phosphate precipitated. The phosphate was washed and centrifuged until it was found to be free from sodium ions. The material was then slurried in water and alumina (particle size: 32–100 mesh) was incorporated into the slurry; an adherent coating of uranyl phosphate, possibly uranyl pyrophosphate, was obtained on the alumina. The product was dried at about 150° C. and analyzed; it was found to contain 11.1% by weight of uranyl pyrophosphate.

A salt solution containing potassium chloride and aluminum chloride in equimolar amounts and also containing zirconium, ruthenium, neodymium and samarium chlorides as typical fission product salts was prepared, melted and maintained at 700° C. An about equal weight of the uranyl-pyrophosphate-coated alumina was then added to this salt solution, and the slurry obtained was sparged with helium gas for two hours. After this, the slurry was allowed to settle. A sample of the supernatant was withdrawn and counted with the xenon proportional counter of an X-ray fluorescence spectrograph. The results are given in Table III.

TABLE III

| Element | Initial Counts/sec. | Final Counts/sec. | DF |
|---|---|---|---|
| Zr | 7,840 | 308 | 25 |
| Ru | 4,350 | <10 | >435 |
| Nd | 233 | 3.5 | 67 |
| Sm | 361 | 3.0 | 120 |

The above results clearly show that the material proved effective in removing a great fraction of all four of the fission products of the salt solution.

It will be understood that the invention is not to be limited to the details given herein but that it may be modified within the scope of the appended claims.

The embodiments of the invention in which an exclusive property or privilege is claimed are defined as follows:

1. A process of preparing an adsorbent comprising preparing an aqueous slurry of uranyl phosphate, contacting silica particles with said slurry, separating the impregnated particles from the supernatant, and heating said particles at from 130 to 175° C.

2. The process of claim 1 wherein the uranyl phosphate is uranyl monohydrogen phosphate.

References Cited

UNITED STATES PATENTS

| | | | |
|---|---|---|---|
| 1,825,509 | 9/1931 | Collins | 117—113 |
| 1,930,646 | 10/1933 | Hollis et al. | 117—113 |
| 1,939,647 | 12/1933 | Arnold et al. | 252—437 X |
| 2,362,311 | 11/1944 | Rubin | 252—437 X |
| 2,496,621 | 2/1950 | Deery | 252—437 X |
| 2,569,092 | 9/1951 | Deering | 252—437 X |
| 2,795,479 | 6/1957 | Bernstein et al. | 23—346 |
| 2,811,416 | 10/1957 | Russell et al. | 23—329 |
| 2,894,891 | 7/1959 | Grebe | 176—90 X |
| 3,028,330 | 4/1962 | Justheim et al. | 176—90 X |
| 3,044,946 | 7/1962 | Litton | 252—301.1 |
| 3,063,923 | 11/1962 | Mayer | 252—301.1 |

WILLIAM D. MARTIN, *Primary Examiner.*

L. DEWANYNE RUTLEDGE, *Examiner.*

A. G. BOWEN, T. G. DAVIS, *Assistant Examiners.*